United States Patent
Keljo

(10) Patent No.: US 7,861,230 B2
(45) Date of Patent: Dec. 28, 2010

(54) PROFILING API SHIMS

(75) Inventor: Jonathan W. Keljo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 11/420,056

(22) Filed: May 24, 2006

(65) Prior Publication Data

US 2007/0288940 A1    Dec. 13, 2007

(51) Int. Cl.
*G06F 9/44* (2006.01)
(52) U.S. Cl. .................. 717/127; 717/124; 717/126; 717/130; 719/328
(58) Field of Classification Search ........................ None
See application file for complete search history.

(56) References Cited

U.S. PATENT DOCUMENTS

| | | | |
|---|---|---|---|
| 5,787,245 A * | 7/1998 | You et al. | 714/38 |
| 7,086,064 B1 * | 8/2006 | Stevens | 719/310 |
| 7,512,934 B2 * | 3/2009 | Gatlin et al. | 717/127 |
| 7,716,643 B2 * | 5/2010 | Goldin | 717/124 |
| 2007/0169003 A1 * | 7/2007 | Branda et al. | 717/130 |

OTHER PUBLICATIONS

JavaTM Virtual Machine Profiler Interface (JVMPI), Technical Documentation, http://java.sun.com/j2se/1.3/docs/guide/jvmpi/jvmpi.html, page archived Aug. 31, 2005 on archive.org.*
Christof Schmalenbach and Christian Höfig, The Java Virtual Machine Profiler Interface, Jul. 1, 2004, http://www.ddj.com/java/184405722.*
Msdn, .Net Framework 4, Profiling Overview; retrieved Jun. 15, 2009; 7 pages.*
David Browne, forum post, Jun. 11, 2004, retrieved Nov. 20, 2009; 2 pages.*

* cited by examiner

*Primary Examiner*—Hyung S Sough
*Assistant Examiner*—Kimberly Jordan

(57) ABSTRACT

A method and system for profiling API shims is described herein. The system includes a profiler, a profiling application program interface (API), and a profiling shim. The profiling shim intercepts communications between the profiler and the profiling API. Calls from and to the profiler are chained through the profiling shim. The profiling shim may further log calls to functions from and to the profiler and/or validate the profiler's usage of the profiling API.

14 Claims, 4 Drawing Sheets

PROFILING API SHIMS

BACKGROUND

Software developers often wish to add some piece of functionality to their software without modifying the core parts of the code itself. There are various reasons for this. For example, it may not be prudent to change the code due to schedule pressures or fragility concerns. Also, the functionality may not be core to the software, and thus makes more sense to be structured as an add-on. Furthermore, the functionality itself may only be needed for a very limited period of time, such as while diagnosing a particular problem.

Profilers targeting runtime environments try keep their overhead as low as possible. The developers of profilers may insert diagnostic code, such as assertions or logging statements in debug builds. However, they do not want to pay even the small speed cost of checking whether such functionality is desired or the larger size cost of keeping the dormant code around. Therefore, developers of profilers will typically remove the diagnostic code from retail builds. There is no easy way to insert functionality for debugging and other purposes without modifying the code itself.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for profiling API shims. In accordance with one implementation of the described technologies, a profiling shim is inserted between a profiler and a profiling application program interface (API) in a managed execution environment. The profiling shim intercepts communications between the profiler and the profiling API. Calls from and to the profiler are chained through the profiling shim. By using the profiling shim, additional functionality may be added without changing the code of the profiler. For example, the profiling shim may log calls to callback functions and information functions from and to the profiler. This logged information may be used to measure profiler overhead, get a context for incorrect profiler behavior, gain insight into how the profiler uses the profiling API, as well as for other purposes.

In another implementation of the described technologies, the profiling shim may validate the profiler's usage of the profiling API. The profiling shim may change the behavior of the profiling API functions to flush out bugs in the profiler, detect improper call sequences, detect the use of incorrect parameters, and/or perform other validation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
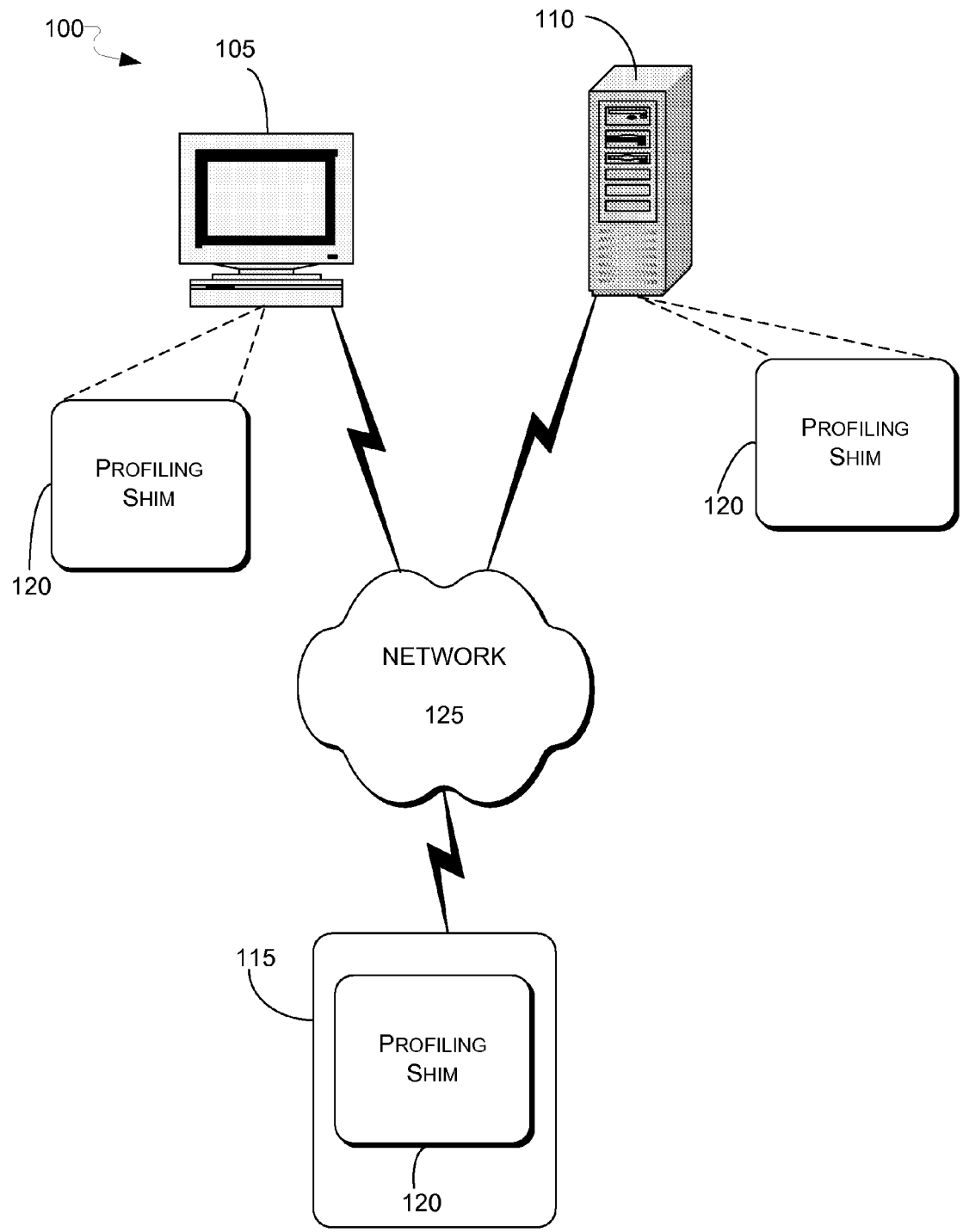
FIG. 1 is an example network environment 100 in which example technologies certain aspects of the invention may be implemented.

FIG. 1 shows example network environment 100 in which example technologies may be implemented for a profiling application program interface (API) shim. In FIG. 1, client device 105, server device 110, and "other" device 115 may be communicatively coupled to one another via network 125; and, further, at least one of client device 105, server device 110, and "other" device 115 may be capable of implementing the aforementioned technologies.

Client device 105 may represent at least one of a variety of known computing devices, including a desktop personal computer (PC), workstation, mainframe computer, Internet appliance, set-top box, or gaming console, that is able to implement example technologies. Client device 105 may further represent at least one device that is capable of being associated with network 125 by a wired and/or wireless link, including a mobile (i.e., cellular) telephone, personal digital assistant (PDA), laptop computer, etc. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation for a profiling shim 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110. "Other" device 115 may represent any further device that is capable of implementing a profiling shim 120 according to one or more of the example technologies described herein. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (LANs), such as an 802.11 system or, on a larger scale, a wide area network (WAN), or a personal area network (PAN), such as Bluetooth.

Computer architecture in at least one of devices 105, 110, and 115 has typically defined computing platforms in terms of hardware and software. Software for computing devices has been categorized into groups, based on function, which may include: a hardware abstraction layer (alternatively referred to as a "HAL"), an operating system (alternatively referred to as "OS"), and applications.

A runtime execution environment may reside between an OS and an application, program, function, or other assemblage of code. The runtime execution environment may serve as a space in which the application, program, function, or other assemblage of code may execute specific tasks on any one or more of processing devices 105, 110, and 115. More particularly, a runtime execution environment may enhance the reliability of the execution of an application, program, function, or other assemblage of code on a growing range of processing devices 105, 110, and 105, including servers, desktop computers, laptop computers, and mobile processing/communication devices by providing a layer of abstraction and services for an application running on such devices, and by further providing the application, program, function, or other assemblage of code with capabilities including memory management and configuration thereof.

A runtime execution environment may serve as at least one of a programming and an execution platform. As a programming platform, a runtime execution environment may compile one or more targeted applications, programs, functions, or other assemblages of code, which may be written in one of multiple computing languages, into an intermediate language (hereafter "IL") or bytecode. IL is typically independent of the platform, and the central processing unit (hereafter "CPU") executes IL. In fact, IL is a higher level language than many CPU machine languages.

As an execution platform, a runtime execution environment may interpret compiled IL into native machine instructions. A runtime execution environment may utilize either an interpreter or a compiler to execute such instructions. Regardless, the native machine instructions may then be directly executed by the CPU. Since IL is CPU-independent, IL may execute on any CPU platform as long as the OS running on that CPU platform hosts an appropriate runtime execution environment.

Alternatively, at least portions of applications, programs, functions, or other assemblages of code may be precompiled and loaded as one or more native image files in the runtime execution environment, thus circumventing CPU consumption required for compilation. Effectively, the precompiled portions are software modules that are distributed in an IL format (e.g., assemblies, methods, or types) rather than in a native platform execution format. A source of such precompiled IL may be disposed in either of a non-managed execution environment or a separate implementation of a runtime execution environment on a same or separate one of devices 105, 110, and 115. The source may deploy the precompiled IL during or before install time for the application, program, method, function, or other assemblage of code to which the precompiled IL corresponds.

Regardless, examples of runtime environments include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, this listing of runtime environments provides examples only. The example technologies described herein are not limited to just these managed execution environments. More particularly, the example implementations are not just limited to managed execution environments, for one or more examples may be implemented within testing environments and/or unmanaged execution environments.

An application, program, function, or other assemblage of code compiled into IL may be referred to as "managed code," and that is why a runtime execution environment may be alternatively referred to as a "managed execution environment." It is noted that code that does not utilize a runtime execution environment to execute may be referred to as a native code application.

Figure 2:
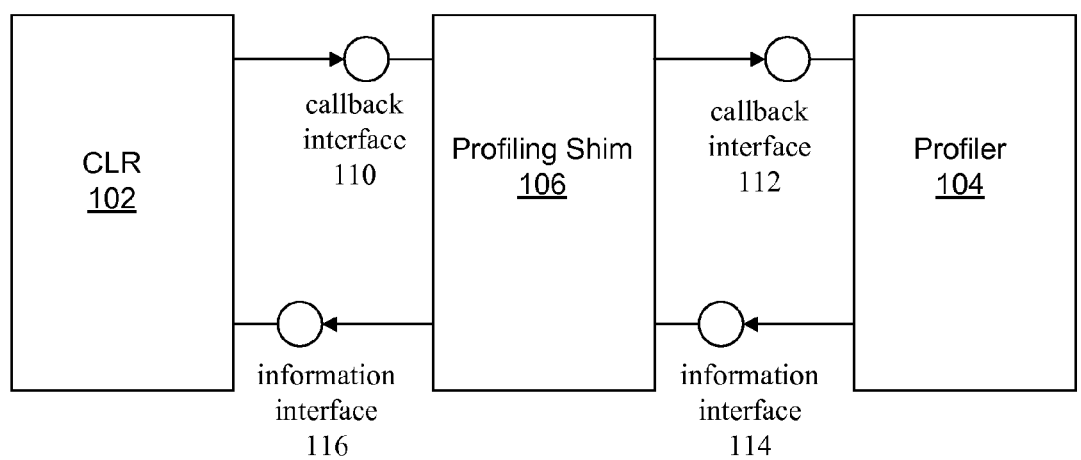
FIG. 2 is a block diagram illustrating an exemplary system for profiling API shims.

FIG. 2 is a block diagram illustrating an exemplary system 200 for profiling API shims in a managed execution environment. Profiler 104 may monitor, track, collect, store, or otherwise profile one or more of the interactions among code modules in the managed execution environment. Furthermore, interactions between any code modules with the managed execution environment or an OS may also be profiled or recorded. A profiling shim, such as 106, is a special type of profiler that allows other profilers, such as 104, to attach to it.

A profiling application program interface (API) exposes one or more functions to the profiler 104. In the context of the example implementations described herein, the profiling API may be regarded as a language and message format provided by the managed execution environment to enable profiler 104 to communicate with the functionality in the managed execution environment. As shown in the exemplary system 200, the profiling API includes a callback interface 112 by which the CLR 102 notifies the profiler 104 of events and an information interface 116 by which the profiler 104 requests information from the CLR 102, typically in response to a callback.

Profiling shim 106 includes a callback interface 110 and an information interface 114. When the CLR 102 calls a function on the profiling shim's callback interface 110, the profiling shim 106 chains the call through to the profiler 104. When the profiler 104 calls a function on the profiling shim's information interface 114, the profiling shim 106 chains the call to the CLR 102. Before or after chaining a call, the profiling shim 106 may perform one or more actions. Since profiling shim 106 may be inserted as desired, the profiling shim 106 may add functionality without changing the code of the profiler 104.

For example, the profiling shim 106 may log one or more calls to one or more functions, such as callback functions or information functions. These logged calls may be used for various purposes including but not limited to measuring profiler overhead, getting a context for incorrect profiler behavior, and gaining insight into how the profiler uses the profiling API.

The profiling shim 106 may also be used to validate the profiler's usage of the profiling API. For example, the profiling shim may detect improper call sequences, change the behavior of profiling API functions for debugging, detect use of incorrect parameters, as well as perform other validation actions.

The profiling shim 106 may enable a profiler to attach to an already running program. A user may launch a program with the profiling shim registered as the program's profiler. Then, when the profiler 104 is attached to the profiling shim 106, the profiler 104 may begin profiling without further delay. In addition to the examples described above, other functionality may be performed by the profiling shim 106 as desired.

Figure 3:
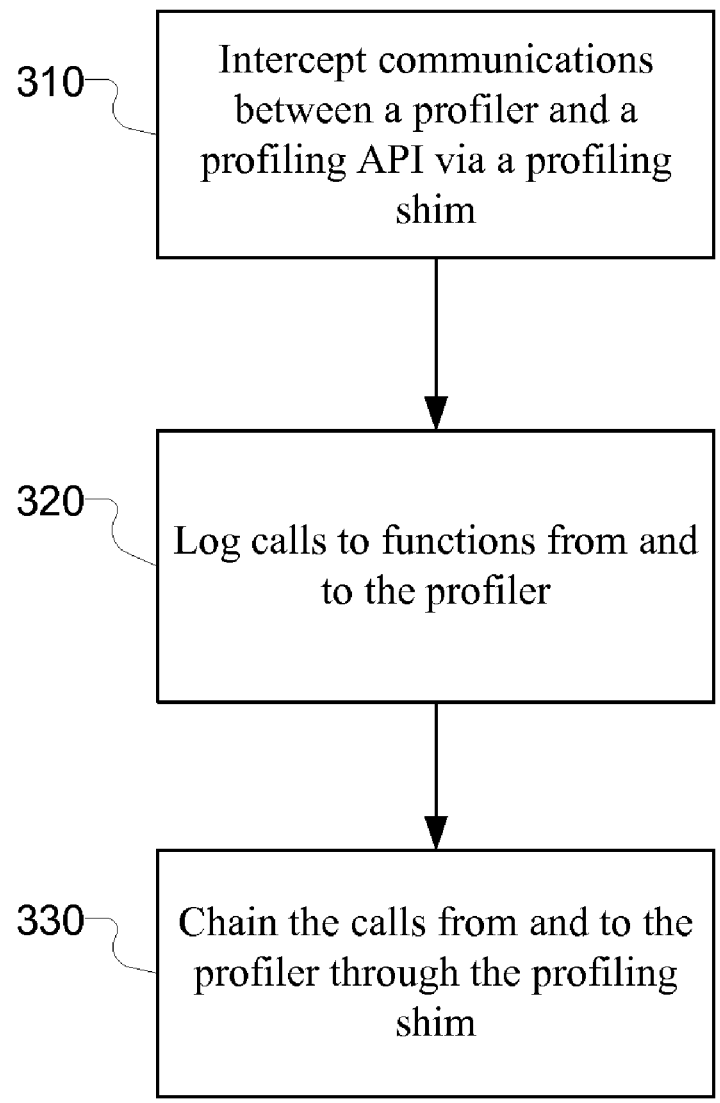
FIG. 3 is a flow diagram illustrating an exemplary process for profiling API shims.
Figure 4:
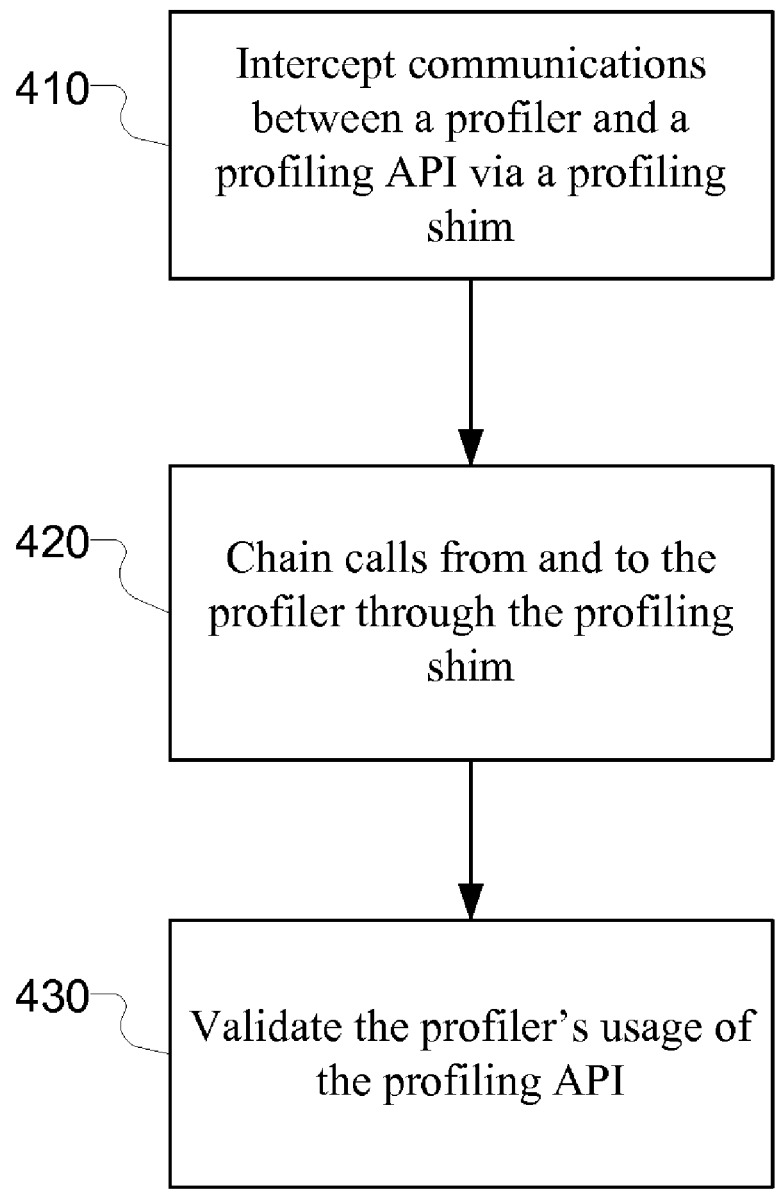
FIG. 4 is a flow diagram illustrating an exemplary process for profiling API shims.

FIGS. 3-4 are flow diagrams illustrating exemplary processes for profiling API shims. While the description of FIGS. 3-4 may be made with reference to other figures, it should be understood that the exemplary processes illustrated in FIGS. 3-4 are not intended to be limited to being associated with the systems or other contents of any specific figure or figures. Additionally, it should be understood that while the exemplary processes of FIGS. 3-4 indicate a particular order of operation execution, in one or more alternative implementations, the operations may be ordered differently. Furthermore, some of the steps and data illustrated in the exemplary processes of FIGS. 3-4 may not be necessary and may be omitted in some implementations. Finally, while the exemplary processes of FIGS. 3-4 contain multiple discrete steps, it should be recognized that in some environments some of these operations may be combined and executed at the same time.

Referring to FIG. 3, at 310, communications between the profiler and the profiling API are intercepted by a profiling shim. At 320, one or more function calls from and to the profiler are logged. At 330, the function calls from and to the profiler are chained through the profiling shim. The logged information may be used for various purposes including but not limited to measuring profiler overhead, getting a context for incorrect profiler behavior, and gaining insight into how the profiler uses the profiling API. In one embodiment, a program may be launched with the profiling shim registered as the program's profiler. Then, the profiler may be attached at a later time and begin profiling without further delay.

Referring to FIG. 4, at 410, communications between the profiler and the profiling API are intercepted by a profiling shim. At 420, calls from and to the profiler are chained through the profiling shim. At 430, the profiler's usage of the profiling API is validated. Validation actions performed by the profiling shim include but are not limited to detecting improper call sequences, changing the behavior of profiling API functions for debugging, and detecting use of incorrect parameters. Other actions may be performed before or after the profiling shim chains the calls. Certain process aspects described herein may be performed using instructions stored on one or more device-readable storage media that cause a device to perform the process steps.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method implemented at least in part by one or more processing devices comprising:
   intercepting communications between a first profiler and a profiling application program interface (API) via a second profiler, wherein the second profiler is attached to the first profiler;
   logging calls to functions from and to the first profiler;
   chaining the calls from and to the first profiler through the second profiler;
   utilizing the second profiler to validate use of the profiling API by the first profiler; and
   launching a program with the second profiler registered as the program's profiler and attaching the first profiler to the second profiler after launching the program with the second profiler registered as the program's profiler.

2. The method of claim 1, wherein the second profiler includes a callback interface.

3. The method of claim 1, wherein the second profiler includes an information interface.

4. The method of claim 1, further comprising utilizing the second profiler to measure overhead of the first profiler based on the logged calls.

5. The method of claim 1, further comprising utilizing the second profiler to determine how the first profiler uses the profiling API based on the logged calls.

6. The method of claim 1, wherein utilizing the second profiler to validate the first profiler's usage of the profiling API comprises changing a behavior of individual functions of the profiling API for debugging.

7. A system comprising:
   a profiler one or more processing devices;
   a profiling application program interface (API) to expose one or more functions in a managed execution environment implemented at least in part by the one or more processing devices; and
   a profiling shim configured to:
      attach to the profiler and chain calls to individual functions from and to the profiler; and
      validate the profiler's usage of the profiling API by changing a behavior of one or more functions of the profiling API for debugging.

8. The system of claim 7, wherein the profiling shim is further configured to log the calls to the individual functions from and to the profiler.

9. The system of claim 7, wherein the profiling shim includes a callback interface.

10. The system of claim 7, wherein the profiling shim includes an information interface.

11. One or more device-readable storage media with device-executable instructions stored thereon which cause a device to perform steps comprising:
    launching a program with a first profiler, wherein the first profiler comprises a profiling shim registered as the program's profiler;
    attaching a second profiler to the first profiler while the program is running;
    intercepting, via the profiling shim, communications associated with the program, the communications being between the second profiler and a profiling application program interface (API); and
    utilizing the profiling shim to change a behavior of a function of the profiling API for debugging.

12. The one or more device-readable storage media of claim 11, further comprising utilizing the profiling shim to validate the second profiler's usage of the profiling API by detecting one or more call sequences.

13. The one or more device-readable storage media of claim 11, further comprises utilizing the profiling shim to validate the second profiler's usage of the profiling API by detecting use of incorrect parameters.

14. The one or more device-readable storage media of claim 11, wherein the steps further include utilizing the profiling shim to log individual functions that are called.

* * * * *